United States Patent [19]

Hofmeister et al.

[11] Patent Number: 5,335,062
[45] Date of Patent: Aug. 2, 1994

[54] APPARATUS FOR ALL-OPTICAL SELF-ALIGNING HOLOGRAPHIC PHASE MODULATION AND MOTION SENSING AND METHOD SENSING AND METHOD FOR SENSING SUCH PHASE MODULATION

[75] Inventors: Rudolf Hofmeister, Pasadena; Amnon Yariv, San Marino, both of Calif.

[73] Assignee: California Institute of Technology, Pasadena, Calif.

[21] Appl. No.: 978,811

[22] Filed: Nov. 19, 1992

[51] Int. Cl.⁵ .............................................. G01B 9/02
[52] U.S. Cl. ................................... 356/347; 356/345
[58] Field of Search .............. 356/345, 347, 348, 353; 359/300

[56] References Cited

U.S. PATENT DOCUMENTS 4,987,607  1/1991  Gilbreath et al. ..................... 455/618
5,136,666  8/1992  Anderson et al. ..................... 385/24

FOREIGN PATENT DOCUMENTS 100984  5/1986  Japan .................................... 356/345

OTHER PUBLICATIONS

Vibration Detection Using Dynamic Photorefractive Gratings in KTN/KLTN Crystals, by Hofmeister et al., Applied Physics Letters 61 (201), Nov. 16, 1992.
Characterization of a New Photorefractive Material: $K_{1-y}L_yT_{1-x}N_x$, by Agranat et al., 1992 Optics Letters, vol. 17, No. 10, May 15, 1992.
New Photorefractive Mechanism in Centrosymmetric Crystals: A Strain–Coordinated Jahn–Teller Relaxation, by Hofmeister, et al., Physical Review Letters, vol. 69, No. 9, Aug. 31, 1992.
Simple Methods of Measuring the Photorefractive Phase Shift and Coupling Constant, by Hofmeister et al., to be published in Optics Letters on Apr. 1, 1993.

*Primary Examiner*—Samuel A. Turner
*Assistant Examiner*—Robert Kim
*Attorney, Agent, or Firm*—Poms, Smith, Lande & Rose

[57] ABSTRACT

An all-optical, self-aligning, holographic phase modulation and motion sensing apparatus includes a crystal exhibiting a zero electric field photorefractive effect, a phase modulation or vibration source or mechanism, a source of coherent optical radiation, beam splitting and directing optics, and at least one optical radiation detector. The output from the optical radiation source is split into separate beams, one or all of which are phase modulated. The beams are directed through the crystal exhibiting a zero electric field photorefractive effect, and the resultant transmitted beams are detected by an optical radiation detector to provide a measurement of the phase modulation of the beams. The sensor functions in the absence of an electric field because of the unique characteristic of the crystal exhibiting the zero electric field photorefractive effect whereby if either the phase of the crystal's index grating or of the interfering beams is modulated with a phase change very much less than $\pi/2$, the intensity of the beam transmitted through the crystal varies linearly with the modulation. Such linear modulation allows crystals exhibiting the zero electric field photorefractive effect to remotely sense phase modulations or vibrations of any type in the absence of electrical signals in the vicinity of the sensor.

24 Claims, 2 Drawing Sheets

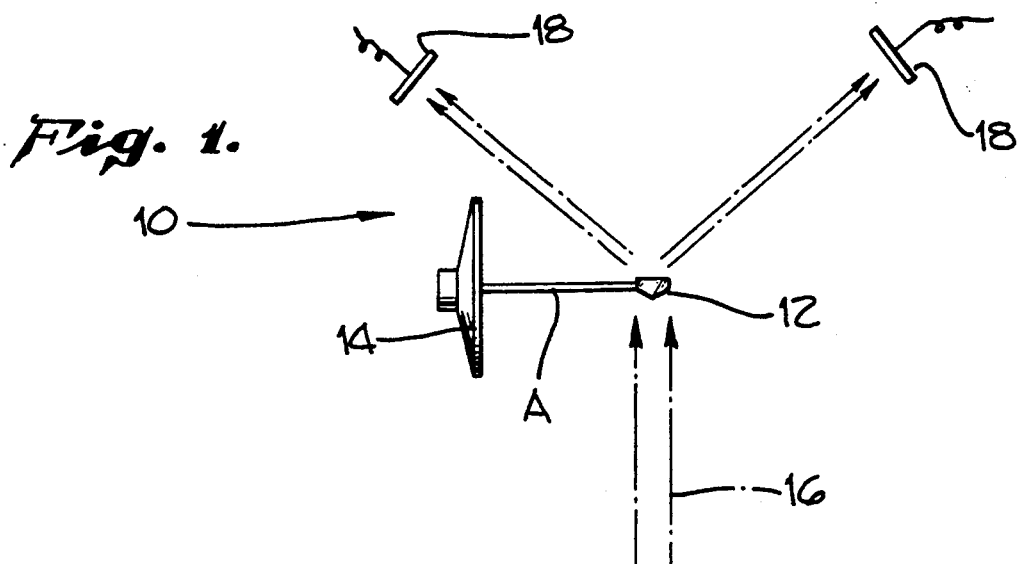
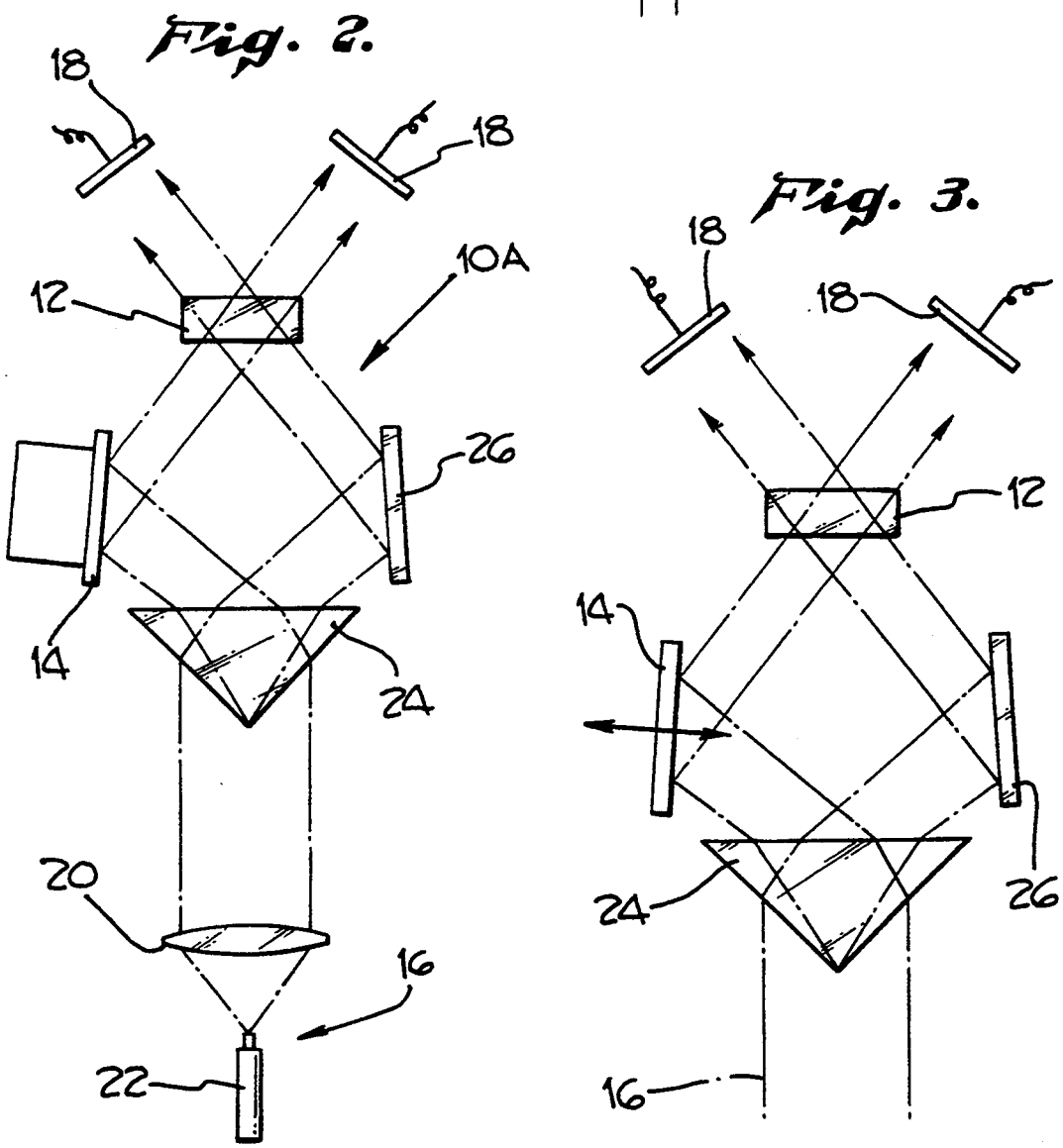

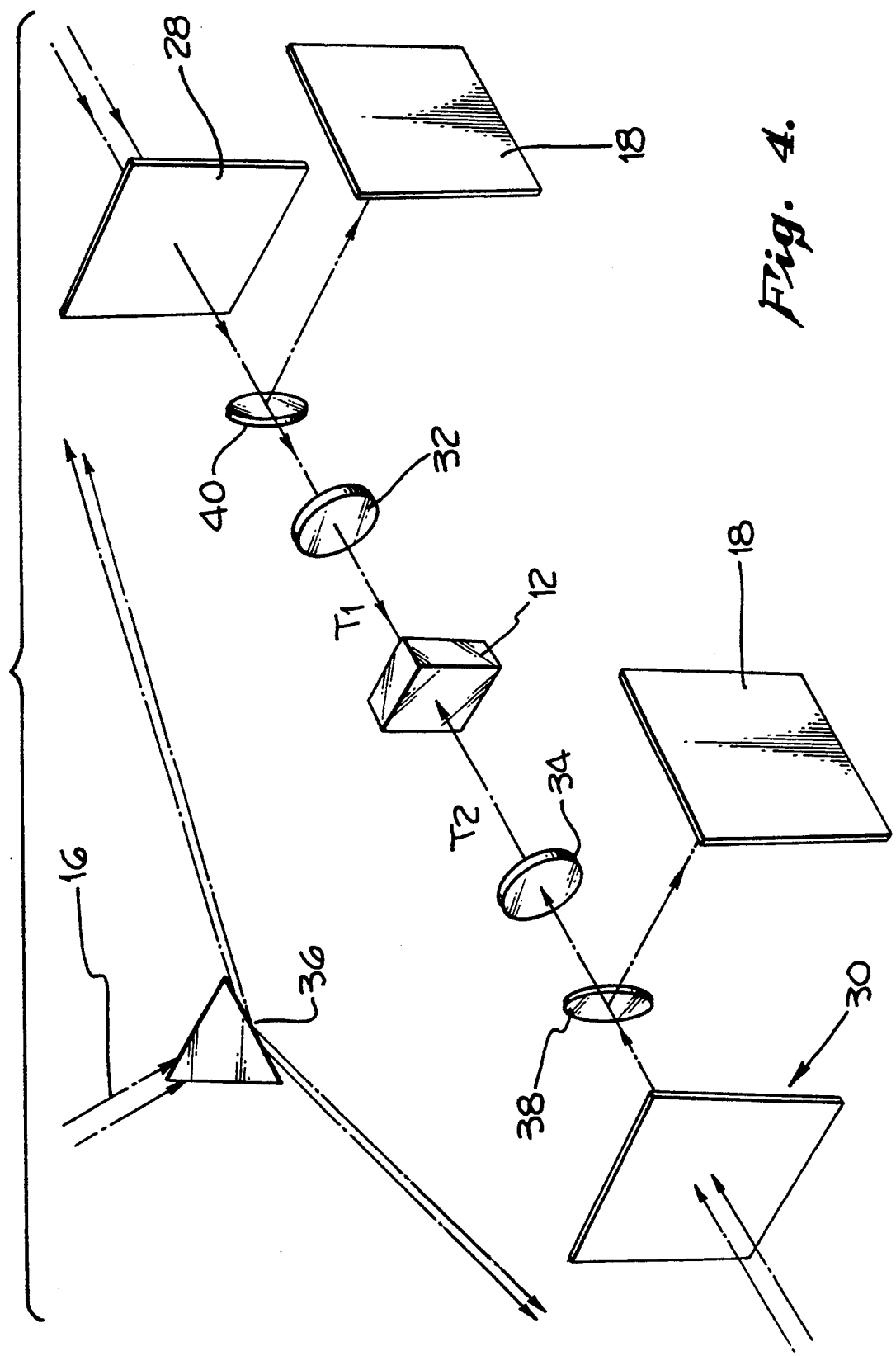

APPARATUS FOR ALL-OPTICAL SELF-ALIGNING HOLOGRAPHIC PHASE MODULATION AND MOTION SENSING AND METHOD SENSING AND METHOD FOR SENSING SUCH PHASE MODULATION

This invention was made with government support under U.S. Army Contract No. DAAL-03-91-G-0305. The U.S. government has certain rights in the invention.

BACKGROUND OF THE INVENTION
1. Field Of The Invention

The present invention relates to phase modulation and motion sensing devices and more particularly to a method and apparatus for performing all-optical, self-aligning, holographic phase modulation and motion sensing utilizing a zero external electric field photorefractive effect in paraelectric materials.

2. Description Of The Prior Art

Modernly, a wide variety of sensing devices, including electrical, mechanical and optical sensors, as well as various combinations of such sensors, are utilized in a large number of applications, including manufacturing and testing, research and development, information processing, communications, consumer products, and military applications, to name just a few. Various advantages and disadvantages, relating to a host of factors, including size, sensitivity, stability, responsiveness, alignment difficulty and cost, to name just a few, are attendant upon different types of sensors and are of critical concern depending upon the particular application or need to which a sensor is to be addressed. To this end, sensor technology is a rapidly growing field with great attention being paid to new and innovative types of sensors and sensing methods. In particular, all-optical sensors and sensing methods are presently receiving considerable attention for use in applications where electrical signals cannot be used or are impractical. Such applications include, but are not limited to, aqueous, explosive, corrosive and electromagnetically sensitive environments.

With respect to all-optical sensors, intensity modulating sensors, primarily because of their relative ease of alignment, have traditionally been preferred over interferometric and phase modulation techniques. However, even intensity modulating all-optical sensors have significant alignment problems, typically due to the precise component positioning required to obtain good sensor sensitivity. These alignment problems also result in sensors that are not mechanically robust.

Thus, a need exists for an all-optical sensor and sensing method that may be used in applications where electrical signals are forbidden or are impractical, that is relatively mechanically robust, that provides ease of alignment and that operates via a phase modulation, rather than an intensity modulation, technique.

SUMMARY OF THE INVENTION

Accordingly, a principal object of the present invention is to provide an all-optical sensor and sensing method suitable for use in applications and environments where electrical signals cannot be used or are impractical.

A further object of the present invention is to provide an all-optical sensor and sensing method that are self-aligning.

Yet another object of the present invention is to provide an all-optical sensor and sensing method that utilizes phase modulation, as opposed to intensity modulation, techniques.

Yet a further object of the present invention is to provide an all-optical sensor and sensing method that are more mechanically robust than prior all-optical sensors.

In accomplishing these and other objects, there is provided an all-optical sensor comprising a crystal exhibiting a zero electric field photorefractive effect, which effect is described more fully hereinbelow, a phase modulation or vibration source or mechanism, a source of coherent optical radiation, a beam splitter mechanism and one or more optical radiation detectors. The output beam from the optical radiation source is split into first and second beams by the beam splitter and one or both beams is phase modulated. The beams are directed through the photorefractive crystal exhibiting a zero electric field photorefractive effect, and the resultant transmitted beams are detected by one or more optical radiation detectors to provide a measurement of the phase modulation of the beams.

The all-optical sensor of the present invention is able to function in the absence of an electric field because of the zero electric field photorefractive effect (Zefpr effect) of its crystal, which effect has unique characteristics.

Generally, photorefractive effects are manifested as a change in the refractive index of a material when the material is exposed to light. When such a material is illuminated with two or more coherent laser beams, the intensity grating formed through the interference of the laser beams creates a holographic index of refraction grating, or index grating, spatially correlated with the intensity grating. This index grating can cause beam coupling, i.e., power transfer between the beams, with the degree of coupling being determined by the relative phase between the intensity and index gratings. In conventional photorefractive materials, the relative phase between the two gratings is, in general, non-zero. This is a fundamental consequence of the fact that the conventional photorefractive effect arises through the space charge field, which is a non-local effect.

In contrast, the Zefpr effect is due to a local strain relaxation in the crystal created by various photorefractive transition metal dopants in the crystal. The Zefpr effect has been observed in paraelectric KTN (potassium tantalate niobate) and KLTN (potassium lithium tantalate niobate) crystals whose photorefractive dopant was copper. Other candidates expected to exhibit the Zefpr effect include strontium barium niobate, potassium titanyl phosphate, barium titanate, strontium barium titanate and lithium niobate. In a Zefpr effect material, the holographic index grating is modulated by the local concentration of photorefractive transition metal dopants. Consequently, the index grating is in phase spatially with the intensity grating and no beam coupling will occur. This gives rise to the unique circumstance whereby if either the phase of the index grating or of the interfering beams is modulated with a phase change very much less than $\pi/2$, the intensity of the beam transmitted through the Zefpr crystal will vary linearly with the modulation. This linear modulation allows crystals exhibiting the Zefpr effect to remotely sense phase modulations of any type in the absence of any electrical signals in the vicinity of the sensor.

A further aspect of Zefpr crystals is that their detection element consists of a holographic index grating that is continually being rewritten by the intensity grating resulting from the interfering laser beams in the crystal. This results in a sensing device that is self-aligning and resistant to mechanical shocks, thereby exhibiting a more robust mechanical nature than other all-optical sensors.

Further, due to the present invention's ability to operate in an environment where an electric field is prohibited or not practical, it has an enormous number of potential applications. For example, it may be used in corrosive or explosive environments. It may also be used in underwater applications as, for example, an optical hydrophone or underwater detection mechanism. It may also be used to create an untappable optical communications link of great stability. In addition, because the present invention's all-optical sensor is suitable for sensing any type of phase modulation, and is not simply limited to mechanical vibrations, it can be used as a high-speed phase-to-intensity data link that would be actuated through modulation of one of the two input beams by an electro-optic modulator. Such a data link would have a distinct advantage over conventional Mach-Zender type data links in that it is self-aligning, thus compensating for undesired path length changes. The result would be a data link that does not require active path length matching and which is also mechanically robust.

Other objects, characteristics and advantages of the present invention will become apparent from a consideration of the following detailed description with reference to the accompanying drawings.

BRIEF DESCRIPTION OF THE DRAWINGS

FIG. 1 is a schematic representation of one preferred embodiment of the present invention showing an acoustic phase modulation source and a Zefpr crystal functioning as a beam splitter.

FIG. 2 is a schematic representation of a preferred embodiment of the present invention showing an acoustic phase modulation source and a separate prism acting as a beam splitter.

FIG. 3 is a schematic representation of a preferred embodiment of the present invention with a piezo-electric mirror acting as a phase modulation source and a prism acting as a beam splitter.

FIG. 4 is a schematic representation of a preferred embodiment of the present invention showing phase modulation detection through interference of counterpropagated phase transparencies imaged onto a Zefpr crystal.

DETAILED DESCRIPTION OF THE INVENTION

Referring now to the drawings, wherein like numerals represent like parts throughout the several figures, FIG. 1 shows one preferred embodiment of the all-optical, self-aligning, holographic phase modulation sensing device 10 of the present invention. Sensing device 10 includes Zefpr crystal 12, phase modulation or vibration source 14, coherent optical radiation source 16 and optical radiation detectors 18. Zefpr crystal 12 exhibits the zero electric field photorefractive effect, described more fully hereinabove, that forms the basis of the present invention. Zefpr crystal 12 is, in this embodiment of the present invention, formed into a prism-like shape. In this fashion, Zefpr crystal 12 acts as the beam splitting mechanism of the beam of coherent optical radiation produced by optical radiation source 16. The two beams within Zefpr crystal 12 create an intensity grating which in turn forms an index of refraction grating that is continually being rewritten within Zefpr crystal 12. The grating rewrite time is a function of the incoming optical radiation and is given by $\tau \approx 0.1$ sec/I where I is the intensity incident in watts/cm$^2$. If the phase modulation introduced into Zefpr crystal 12 has a much higher frequency than the inverse of the grating rewrite time, then the grating will not be erased.

Acoustic phase modulation source 14 produces a phase modulating output which, as represented by line A, is coupled into Zefpr crystal 12 where it modulates the phase difference between the intensity grating and the index grating in Zefpr crystal 12. As a result of the zero electric field photorefractive effect exhibited by Zefpr crystal 12, the modulation of the phase between the index grating and the intensity grating results in a linear variation of the transmitted intensity of the split beams in crystal 12. This linear variation is then detected by detectors 18 and analyzed to provide a measurement of the phase modulation output of phase modulation source 14. Because of the nature of the zero electric field photorefractive effect exhibited by crystal 12, this measurement may be accomplished in an environment where an electrical signal cannot be used or is impractical.

Turning now to FIG. 2, there is shown another preferred embodiment of the all-optical, self-aligning, holographic phase modulation sensing device 10A of the present invention. This embodiment includes a coherent optical radiation source 16 comprised of a single mode fiber 22 emitting optical radiation that passes through collimating lens 20. Sensor 10A also includes prism 24 which acts as a beam splitter of the output from coherent optical radiation source 16 and which directs the resultant beams to phase modulation source 14 and mirror 26. In this embodiment, phase modulation source 14 is a stretched membrane of metallized plastic which vibrates when sound is present. The output of phase modulation source 14 is coupled into one of the two beams produced by prism 24, which is then redirected through Zefpr crystal 12 where it interferes with the second beam produced by prism 24 which has been directed to Zefpr crystal 12 by reflection off mirror 26. The phase modulation of the interfering beams results in a linear variation of the transmitted intensity of the two beams through Zefpr crystal 12, which is then detected by detectors 18.

FIG. 3 shows yet another preferred embodiment of the present invention in which phase modulation source 14 is comprised of a piezo-electric mirror that introduces a phase modulation into one of the beams produced by prism 24.

FIG. 4 shows another preferred embodiment of the present invention 10B, suitable for phase image subtraction between counterpropagating input phase images. This embodiment of the present invention includes coherent optical radiation source 16, Zefpr crystal 12, first and second phase imaging transparencies 28, 30, first and second imaging lenses 32, 34, first, second and third beam splitters 36, 38, 40 and detectors 18. In this embodiment, the output from coherent optical radiation source 16 is split by first beam splitter 36 and the resultant beams are directed through first and second phase imaging transparencies 28, 30, respectively. First and second phase imaging transparencies 28, 30 modulate the beams passing through them to produce first and second input phase images, which, as represented by $T_1$ and $T_2$, are imaged on Zefpr crystal 12 by first and second imaging lenses 32, 34, and therein interact with one another. The focal depth of the lens configuration must be longer than the interaction region within the crystal. That is, the phase imaging transparencies 28, 30, phase modulate the respective beams passing therethrough to produce respective first and second input phase images. Within the Zefpr crystal 12, these first and second phase input images ($T_1$, $T_2$) interact with one another. The intensity of the resultant transmitted beam portions linearly varies with the phase modulation of the beams (i.e., the intensity of one portion or pixel of one beam increases or decreases in opposition to the intensity of the corresponding portion or pixel of the other beam). The transmitted beams are reflected by splitters 38 and 40 to detectors 18. The intensity of the transmitted beams is optically detected to provide a measurement of the phase modulation of the beams.

Because of the nature of the counterpropagating geometry of the first and second input phase images, each pixel of one input image interacts with only one pixel of the other image, thereby allowing each pair of pixels to be considered independently. Because of the linear variation with phase shift of the output intensities of the beams incident on Zefpr crystal 12, when any pixel's phase is changed, the output intensity of one pixel increases at the expense of its interacting pixel. This results in a phase image subtraction between first and second input phase images $T_1$ and $T_2$ after interfering in Zefpr crystal 12. It also gives a phase to intensity conversion that may be measured by detectors 18.

Experiments have been performed with the all-optical, self-aligning, holographic phase modulation sensor of the present invention. In particular, the embodiment of the present invention depicted in FIG. 2 has been extensively tested. The sensitivity of this device was measured as a noise equivalent pressure level of less than 15 dB sound pressure level at 6 kHz, where 0 dB is taken to be equal to 0.0002 $\mu$bar. The stretched membrane or microphone forming phase modulation source 14 in this experimental configuration responded to frequencies from 200 Hz–20 kHz. However, the fundamental limit of the device's sensitivity is expected to be much better.

It is to be understood that the foregoing description and accompanying drawings relate only to preferred embodiments of the present invention. Other embodiments may be utilized without departing from the spirit and scope of the invention. For example, other beam splitting mechanisms, such as electro-optical beam splitters, may be utilized in place of the beam splitters identified herein. Similarly, any source or method of introducing a phase modulation into the interfering beams transmitted through Zefpr crystal 12 or the crystal's index grating may be employed. Accordingly, it is to be further understood that the description and drawings set forth hereinabove are for illustrative purposes only and do not constitute a limitation on the scope of the invention.

What is claimed is:

1. An all-optical, self-aligning, holographic phase modulation and motion sensor comprising:
    a crystal exhibiting a zero electric field photorefractive effect;
    a phase modulation source having a phase modulating output;
    a coherent optical radiation source having an output beam;
    means for splitting said output beam into first and second beams;
    at least one optical radiation detector; and
    means for coupling said phase modulating output into at least one of said first and second beams, directing said first and second beams through said photorefractive crystal, and directing at least one of said beams to said optical radiation detector.

2. An all-optical, self-aligning, holographic phase modulation and motion sensor as in claim 1, wherein said means for splitting said output beam includes said photorefractive crystal being formed into a prismatic beam splitter.

3. An all-optical, self-aligning, holographic phase modulation and motion sensor as in claim 1, wherein said means for splitting said output beam includes a prism independent of said photorefractive crystal.

4. An all-optical, self-aligning, holographic phase modulation and motion sensor as in claim 1, wherein said coherent optical radiation source includes an ion laser.

5. An all-optical, self-aligning, holographic phase modulation and motion sensor as in claim 1, wherein said coherent optical radiation source includes a semiconductor laser.

6. An all-optical, self-aligning, holographic phase modulation and motion sensor as in claim 1, wherein said coherent optical radiation source includes a solid state laser.

7. An all-optical, self-aligning, holographic phase modulation and motion sensor as in claim 1, wherein said coherent optical radiation source comprises a single mode optical fiber and a collimating lens.

8. An all-optical, self-aligning, holographic phase modulation and motion sensor as in claim 1, said means for coupling said phase modulating output into one of said first and second beams further comprises a piezoelectric mirror.

9. An all-optical, self-aligning, holographic phase modulation and motion sensor as in claim 1, wherein said means for coupling said phase modulating output into one of said first and second beams further comprises a vibrating membrane having a reflective surface configured and arranged to reflect one of said first and second beams, said phase modulating output being coupled with said membrane, and said one of said first and second beams being directed from said reflective surface into said photorefractive crystal.

10. An all-optical, self-aligning, holographic phase modulation and motion sensor comprising:
    a crystal exhibiting a zero electric field photorefractive effect;
    a phase modulation source having a phase modulating output;
    an argon ion laser having an output beam;
    a prism for splitting said output beam into first and second beams;
    at least one optical radiation detector; and
    means for coupling said phase modulating output into at least one of said first and second beams, and directing said first and second beams through said photorefractive crystal to said optical radiation detector.

11. A method of sensing phase modulation comprising the steps of:

forming a crystal exhibiting a zero electric field photorefractive effect;

directing a beam of coherent optical radiation through a beam splitter to form first and second beams;

coupling a phase modulation into at least one of said first and second beams;

directing said first and second beams through said photorefractive crystal wherein the transmitted intensity of the two beams will vary linearly, but in opposition to each other, with the coupled phase modulation; and detecting the resultant linearly varying beam intensities with an optical radiation detector whereby said phase modulation is converted to a proportional current modulation.

12. An all-optical, self-aligning, holographic phase modulation and motion sensor comprising:

a crystal exhibiting a zero electric field photorefractive effect;

a coherent optical radiation source having an output beam;

at least two phase imaging transparencies;

means for splitting said output beam into first and second beams and directing said first and second beams into said first and second phase imaging transparencies respectively to produce respective first and second input phase images;

at least one optical radiation detector;

means for imaging said first and second input phase images onto said zero electric field photorefractive crystal wherein phase image subtraction between said first and second input phase images occurs; and means for directing said phase-image-subtracted first and second input phase images to said optical radiation detector.

13. An all-optical, self-aligning, holographic phase modulation and motion sensor as in claim 12, wherein said coherent optical radiation source is an ion laser.

14. An all-optical, self-aligning, holographic phase modulation and motion sensor as in claim 12, wherein said coherent optical radiation source is a semiconductor laser.

15. An all-optical, self-aligning, holographic phase modulation and motion sensor as in claim 14, wherein said coherent optical radiation source is a solid state laser.

16. An all-optical, self-aligning, holographic phase modulation and motion sensor as in claim 14, wherein said means for splitting said output beam is a prism.

17. An all-optical, self-aligning, holographic phase modulation and motion sensor as in claim 14, wherein said means for imaging said first and second input phase images onto said crystal further comprises first and second imaging lenses.

18. An all-optical, self-aligning, holographic phase modulation and motion sensor as in claim 14, wherein said means for directing said phase-image-subtracted first and second input phase images to said optical radiation detector further comprises first and second phase image beam splitters.

19. An all-optical, self-aligning, holographic phase modulation and motion sensor comprising:

a crystal exhibiting a zero electric field photorefractive effect;

a phase modulation source having a phase modulating output;

a coherent optical radiation source having an output beam;

means for splitting said output beam into first and second beams;

at least one optical radiation detector; and means for coupling said phase modulating output into at least one of said first and second beams, directing said first and second beams through said photorefractive crystal, and directing at least one of said beams to said optical radiation detector;

wherein said means for coupling said phase modulating output into one of said first and second beams further comprises a vibrating membrane, and means for coupling vibration from said membrane to said photorefractive crystal.

20. An all-optical self-aligning holographic phase-modulation motion sensor comprising:

a source of a coherent optical radiation input beam;

a Zefpr-type photorefractive crystal receiving both said coherent optical radiation input beam and a physical motion input, said Zefpr crystal being formed into a prismatic beam splitter to split said coherent optical radiation input beam into two beams interacting with one another within said Zefpr crystal, said physical motion input of said Zefpr crystal relative to said coherent optical radiation input beam phase-modulating said two interacting beams relative to one another; and a least one optical detector receiving at least one of said two beams after passage through said crystal and interaction with the other of said two beams, said detector producing an output in response to intensity variation of said at least one beam;

whereby said two beams create an intensity grating and a resultant index grating within said Zefpr crystal, said phase modulation of said two interacting beams resulting in a substantially linear and opposite intensity variation of said two beams which is detected by said optical detector as an intensity variation of said at least one beam and so affects said output therefrom.

21. The sensor of claim 20 wherein said physical motion input is acoustic.

22. A method of sensing a physical input which is manifest as a relative phase difference between two beams of coherent optical radiation; said method comprising the steps of:

providing a crystal having a Zefpr-type photorefractive effect;

providing two coherent optical beams having a known relative phase difference therebetween, which may be a zero difference;

coupling said physical input into a first of said two optical radiation beams to effect a phase modulation thereof and variation of said known relative phase difference;

directing said first phase-varied beam and the second of said two beams simultaneously through said photorefractive crystal for phase interaction therebetween, which phase interaction photorefractively varies the transmitted intensity of at least one of said two beams; and detecting the intensity variation of at least said one beam.

23. An optical phase-modulation sensor comprising:

a source of coherent optical radiation;

a beam splitter dividing said coherent optical radiation into first and second beams of zero or constant phase difference;

means for phase-modulating at least one of said first and second beams to produce a resulting phase difference therebetween;

a Zefpr-type photorefractive crystal receiving both said phase-modulated one beam and the other of said first and second beams on an intersecting course for interaction within said crystal, said crystal providing an intensity grating and a resultant index grating which substantially linearly and oppositely varies the transmitted intensity of both said one and the other of said first and second beams passing through said crystal; and means for detecting the intensity variations of at least one of said first and second beams after passage thereof through said crystal.

24. The sensor of claim 23 wherein said means for phase modulating said at least one of said first and second beams includes at least one phase-image transparency interposed in the path of said at least one beam and through which said at least one beam passes.

* * * * *